INVENTORS.
CHARLES E. HAMLIN
THOMAS J. DORSE

AGENT

INVENTORS.
CHARLES E. HAMLIN
THOMAS J. DORSE
BY Noel F. Conway
AGENT

United States Patent Office 3,106,413
Patented Oct. 8, 1963

3,106,413
PIPE COUPLING HAVING A STATIC SEAL
Charles E. Hamlin, Anaheim, and Thomas J. Dorse, Long Beach, Calif., assignors to North American Aviation, Inc.
Filed Mar. 17, 1958, Ser. No. 721,847
4 Claims. (Cl. 285—212)

This invention relates to a means for sealing a joint between two fluid conducting members, and more specifically, it relates to a high pressure seal between a fitting and a boss into which the fitting is mounted.

More specifically, this invention relates to a high pressure static seal for use in sealing a fitting in the Air Force-Navy Aeronautical Design Standard AND-10050 boss which does not require presetting.

The problem of sealing two fluid conducting members together has existed for a long time and therefore the "sealing art" is crowded with proposed solutions. Many of these have worked satisfactorily at lower temperatures and under small or no vibration conditions. These proposals include a number of various theories of sealing, including that as shown in Patent No. 2,287,889 where a collar is shrunk onto one member to be coupled by the action of an outer collar screwed onto the other member and an inner camming surface cooperating with a camming surface on the first mentioned collar. However, such coupling and sealing means do not work in harsher environments such as are encountered in modern missile systems. These systems operate at high temperatures, high pressures of over 3000 p.s.i. and high vibration conditions such as 50–100 g's and still must be light in weight. In use, one main problem comes from the vibration which causes the pieces being coupled together to move relative to each other in both angular and lateral displacement due to the clearance between the threads necessary to allow the pieces to be threaded together. Therefore, any sealing that will work at the high vibration conditions must have some resiliency to compensate for this relative movement between the members coupled. At low temperatures, this problem could be solved merely by providing an O-ring made of a resilient material such as Kel-F or rubber; however, these materials will not operate at high temperatures and, therefore, some sort of a metal sealing ring must be provided. Seals such as Patent No. 2,287,889 would use a metal seal ring; however, construction such as is shown in the patent provides no resiliency in the sealing member since the inwardly facing camming surface which shrinks the collar onto the inner of the two telescoped members being coupled terminates very close to the inner member merely forming a wedge-shaped opening and the collar is merely a wedge which fills the opening. Further, such structure cannot be taken apart and be reused.

The present invention has the advantages that the sealing ring is forced into sealing relation in such a manner that it has an unsupported length extending between the two members being coupled and thereby provides the resiliency necessary to operate satisfactorily in a high vibration environment. Further, because of this unsupported length between the two members, the sealing ring may be reused many times.

Therefore, it is an object of this invention to provide a static seal between two members.

It is a further object to provide a seal which will operate satisfactorily over a wide range of pressures and temperatures in high vibration conditions.

It is another object of this invention to provide a high performance seal which can be reused and which needs no presetting before being mounted into sealing relation.

It is still a further object of this invention to provide a sealing ring which can be used with a standard Air Force AND-10050 boss. Other objects will become apparent in the detailed description below wherein.

Figures 1, 2:
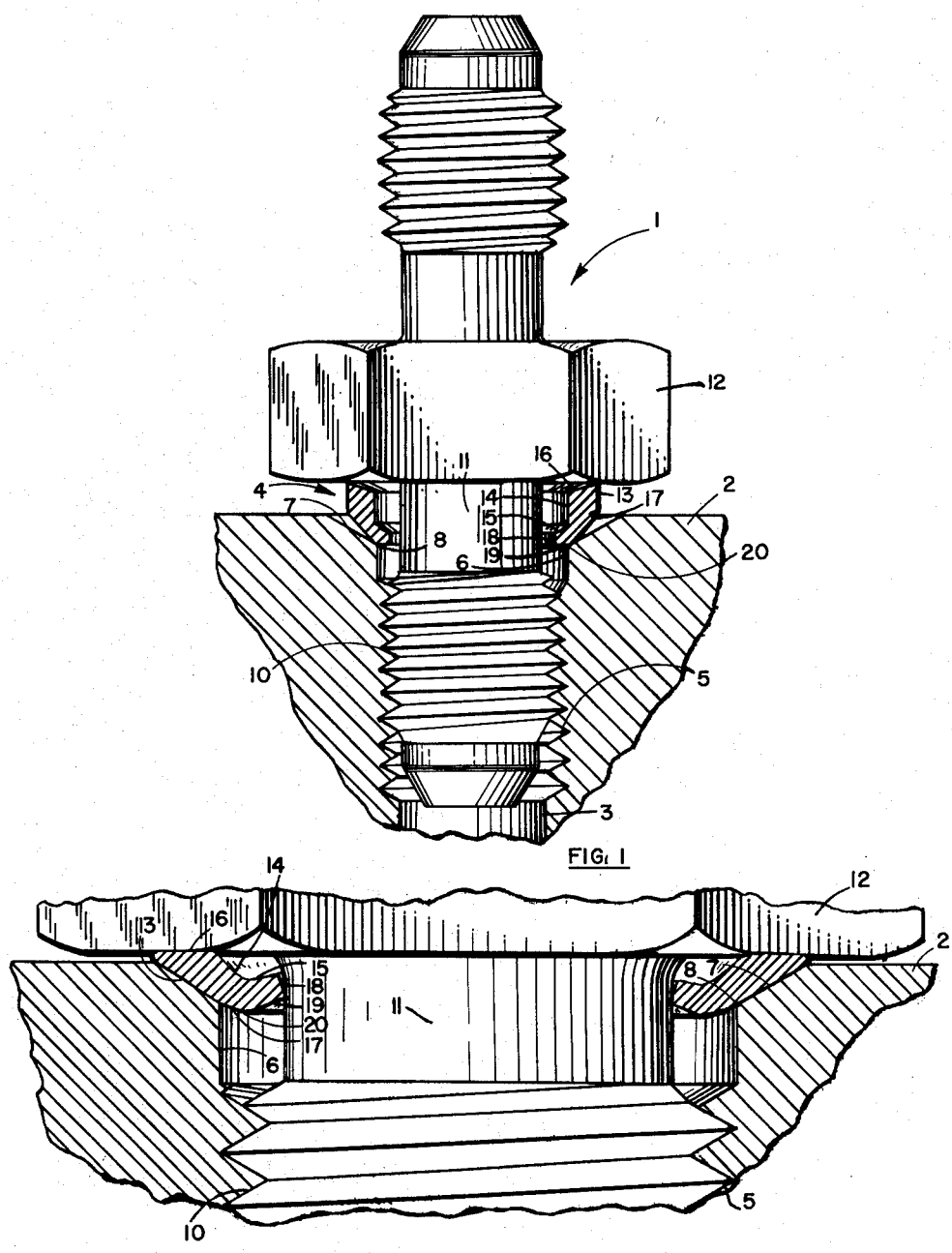
FIG. 1 shows a seal used with a union fitting in a metal boss.
FIG. 2 shows a cross-sectional view of the sealing ring a final sealing position.

FIG. 1 shows a union fitting indicated generally by the arrow 1 partially mounted in the metal boss or body 2 which has a bore 3 therein. A sealing ring indicated generally by the arrow 4 which is one of the specific embodiments of the invention to be described is shown encircling union fitting 1. This sealing ring 4 generates a plane at a right angle to the axis of the fitting. The sealing ring thus lies in a plane which is normal to the axis of the bore.

The downwardly extending bore 3 has female thread portion 5 of a predetermined pitch, pitch diameter, major diameter and minor diameter. These terms are fully described on pages 10–27 of Kent's Mechanical Engineers' Handbook, Design and Production Volume (12th ed.). Above the threaded portion is a counterbore 6 having a diameter which is substantially equal to or slightly larger than the major diameter of the female thread 5 mentioned above. Adjacent to the counterbore 6 is an upwardly and outwardly extending conical camming surface 7 and circumferential edge 8 formed at the intersection of surfaces 6 and 7. The angle that this camming surface forms with the axis of the bore is substantially 30° in the AND-10050 boss but the spirit of the invention does not require this particular angle or shape of the camming surface. The surface must extend upwardly and outwardly at a substantial angle to the axis of the bore.

In order to couple the fitting member 1 to the body 2, the fitting member is provided with "single thread" type male thread portion 10 having predetermined pitch diameter, minor diameter, and major diameter and pitch which cooperates with the female thread 5 as shown. A throat portion, or neck 11 of a diameter substantially equal to said male thread minor diameter is provided above the threaded portion and has the sealing ring 4 encircling it as shown. As enlarged hex portion 12 is provided as means on the fitting to which the torque from a wrench is applied to thread the fitting 1 into the body 2 into sealing relation.

Sealing ring 4 comprises generally an inner and an outer circumferential surface having an inwardly facing sealing surface. The specific embodiment shown has an outer cylindrical surface 13 and an inner cylindrical surface portion 14 which extends downwardly into an inner conical surface portion 15. The inner circumferential surface should extend generally downwardly and inwardly in the area of surfaces 14 and 15 respectively; however, the invention does not require that the inner circumferential surface be cylindrical and conical in the respective areas. For example, the inner circumferential surface may be spherical in the areas of surfaces 14 and 15, or surface 14 could be cylindrical and surface 15 may be spherical, or surface 15 may be conical and surface 14 may be also conical but with its walls at a substantially greater angle to the plane of the seal than surface 15. It is only necessary that the configuration produce a circumferential bent beam as described below. An upper outwardly and upwardly extending conical surface 16 joins the respective upper edges of the inner and the outer cylindrical surfaces 14 and 13 respectively. The apex which is thus formed between the inner cylindrical surface 14 and the conical surface 16 lies axially inwardly of said sealing ring 4. This conical surface forms an angle to the axis of the bore of approximately 70° or 20° to the plane of the seal; however, this angle is not critical. With surface 16 extending outwardly and upwardly as it does the downwardly directed force of the means on the fitting 1, which moves the seal into sealing relation, is applied to the seal as far from the center axis of the seal as possible and facilitates the "curling-in" of the seal as described below. Forming the lower portion of the outer circumferential surface is downwardly facing outer conical surface 17, adjoining the bottom edge of the outer cylindrical surface 13, which cooperates with the conical camming surface 7 mentioned above. This conical surface 17 should be formed at an angle of approximately 35 to 55 degrees to the axis of the bore or conversely at an angle of 55 to 35 degrees to the plane of the sealing ring. The exact angle is not critical within these ranges, but the angle should be such that there is a 5° to 35°, and preferably a 25° angle between the camming surface 7 and the conical surface 17. Similar to the inner circumferential surface, the outer circumferential surface of the sealing ring could be of other cross sectional shapes such as in the above examples.

As shown, a circumferential sealing surface 18 is provided adjoining the lower edge of the inner circumferential surface. The length of the sealing surface, i.e. the dimension parallel to the axis of the bore, should be less than the distance between the adjacent threads on the fitting 1 and the diameter of the sealing surface 18 should be smaller than the major diameter of the male thread. The length of the sealing surface 18 is slightly smaller than the distance between the surfaces of the adjacent male threads at the pitch diameter of the male thread portion 10 and the diameter of the sealing surface 18 was made slightly larger than the pitch diameter of the male thread portion of the fitting on which the particular sealing ring would be used. With this relation, the seal can be moved over the threaded portion of the fitting 1 to the neck portion 11 by placing one side of the sealing surface 18 between two male threads and rotating the sealing ring to more or less "screw" the sealing ring onto the neck.

However, it is necessary that the inner circumferential surface in the portion of surface 15 must not interfere with the male thread of thread portion 10 during the "screwing" operation described above. Therefore, the conical surface 15 must be formed at an angle to the plane of the sealing ring which is less than half the included angle between the adjacent surfaces of the adjacent threads and extend outwardly until its diameter is larger than the major diameter of the male threads. Since the male threads in the specific embodiments shown have an included angle of 60° between the adjacent surfaces, the conical surface 15 is formed at an angle of less than 30° to the plane of the sealing ring. If the surface 15 were of some other shape such as spherical, it would have to have an average slope as it extends outwardly from the sealing surface 18 to where its diameter is greater than the major diameter of the male threads which is less than half the included angle between the adjacent threads. As stated above in the preferred embodiment, the diameter of sealing surface 18 is slightly greater than the pitch diameter of the male thread portion and the length of surface 18 is slightly less than the distance between the adjacent surfaces of the adjacent threads at the pitch diameter. Therefore, since the angle between the threads 60° and the pitch diameter is substantially half way between the major and minor diameter of the male thread, surface 15 must extend outwardly for a distance greater than the length of said sealing surface 18 in order to clear the male threads during the "screwing" operation.

A lower face 19 is provided extending radially from the axis of the bore substantially in the plane of the sealing ring between the sealing surface 18 and the outer conical surface 17. The sealing ring is dimensioned so that the circle 20 which is generated by the intersection of these two surfaces is substantially equal to or slightly larger than the diameter of the counterbore 6 and surface 14. The region of intersection of the conical surface 17 and the lower face 19 is preferably slightly rounded in order to facilitate the "curling-in" of the sealing ring described below.

FIG. 2 discloses the above modification of the invention after it has been moved into sealing relation. Enlarged hex portion 12 not only is a means by which torque is applied to the fitting, but provides a means for forcing of the outer conical surface 17 of the sealing ring against the camming surface 7 causing the section of the sealing ring in the area sealing surface 18 to be curved inwardly thus reducing the dimension of the diameter of the sealing surface until it engages the neck 11 of the fitting 1. Since the camming surface is at a large angle to the axis of the bore, the sealing ring is cammed or "curled" inwardly by surface 7 at a large angle to the axis of the bore, and engages the neck 11 substantially in the plane of circumferential edge 8 as shown. Since the counterbore 6, and consequently circumferential edge 8, is of larger diameter than neck 11, a circumferential bent-beam portion extending between the neck 11 and the circumferential edge 8 is provided. During the "curling-in" operation, the sealing ring 4 in the area of the sealing surface 18 and the lower face 19 has been rotated upwardly relative to the portions of the sealing ring which cooperate with the camming surface 7 and, as shown, face 19 now extends outwardly and downwardly instead of parallel to the plane of the sealing ring. Therefore, the cross section of this circumferential portion looks like a bent beam or column under compression of the two opposite forces applied to either end of the column. This is because the sealing surface 18 engages the neck 11 before the fitting 1 is turned to its proper sealed position and as enlarged hex portion 12 is moved closer to body 2, the sealing ring 4 is squeezed towards the center by the action of the lower face of hex portion 12 and the camming surface 7. This squeezing action compresses the sealing ring and tends to bow the ring in the circumferential bent-beam portion. This compression and bowing action of the circumferential beam portion of the sealing ring results in the resiliency of the seal needed in order to retain a perfect seal over very wide ranges of temperature pressures and vibration conditions. This is because during the transient period of these above conditions, the fitting 1, and the body 2, very often are moved relative to each other within the tolerances between the male and female threads. As mentioned above, the subject seal is the only static seal known to date which is effective in such environments.

It has been found that when the present invention is used in very small seals, specifically for sealing one-eighth inch union or bulkhead fittings, the wall thickness between the inner and outer surfaces 14 and 13 in the first embodiment shown is so small that the wall is crushed before it will curl the sealing surface 18 into sealing relation with the neck 11. This problem is alleviated by providing the means on the fitting which forces the sealing ring into sealing relation with a circular recess similar to that shown in FIGS. 3 and 4 having an inwardly facing circumferential wall encircling the outer cylindrical wall of the sealing ring. In the first embodiment shown, this is accomplished by machining a circular recess in the bottom side of enlarged hex portion 12 with a diameter which is equal to the diameter of the external cylindrical surface 13.

Figure 3:
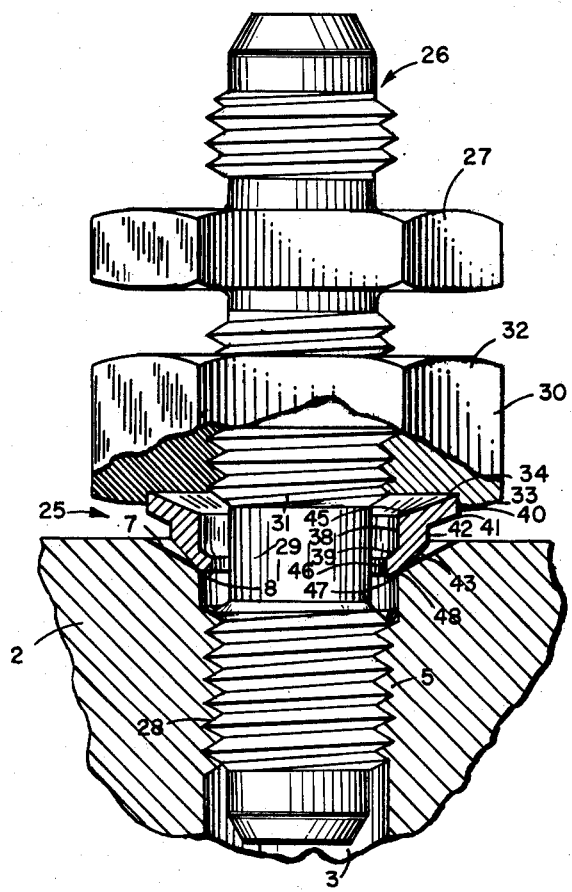
FIG. 3 shows a modified seal used with a bulkhead fitting in a metal boss.

FIG. 3 discloses a bulkhead fitting 26 which is another type of standard AND fitting for which the present invention is useful. Although the sealing ring shown in the first embodiment may be used with a bulkhead fitting, a modified sealing ring, indicated generally by arrow 25, is shown. This sealing ring is substantially the same as the sealing ring 4 except that it has been modified so that, if needed, the wall of the sealing ring can receive support from the wall 35 of the standard recess 34 which is provided in the standard nut 30 on the bulkhead fitting. The diameter of the standard recess 34 is larger than the external diameter of the type of sealing ring shown in the first embodiment and therefore an outwardly projecting circumferential portion is provided as shown. The bulkhead fitting has an enlarged hex portion 27 through which a torque is applied in order to thread the male thread 28 of the fitting 26 into the female thread portion 5 of the body 2. The sealing ring 25 is "screwed" over the male thread 28 in the same manner as described in connection with the first embodiment. Then bulkhead fitting 26 is threaded into the body 2 until the neck 29 which is immediately above the male thread 28 is in the area of the counterbore 6 and the camming surface 7.

The sealing ring 25 has an inner circumferential surface consisting of the cylindrical surface 38 and the downwardly and inwardly extending conical portion 39. As indicated above, cylindrical and conical configurations are shown because they are easy to machine but the spirit of the invention only requires that the configuration be such that the internal circumferential surface extends outwardly from the circumferential sealing surface rapidly enough to avoid interference with the male thread which will allow "screwing" over the male threads as described above. Such a configuration will also produce the circumferential bent beam described above by the "curling" operation. Extending between the inner and outer circumferential surfaces is the upper outwardly and upwardly extending conical surface 45 similar to the upper conical surface 16. The outer circumferential surface has outwardly displaced cylindrical surface 40 extending downwardly from the top of the sealing ring. Cylindrical surface 40 receives support from cylindrical surface 35 and prevents the wall of the sealing ring from being crushed outwardly. Adjacent the lower edge of the surface 40 is provided inwardly and downwardly extending conical portion 41 which terminates at its lower edge where it intersects downwardly extending outer cylindrical surface 42. Cylindrical surface 42 is equivalent to the outer cylindrical surface 13 shown in the first modification of the invention and downwardly facing outer conical surface 43 is provided at the lower edge of the cylindrical surface 42 similarly to conical surface 17 in the first embodiment and cooperates with the camming surface 7 as described above in conjunction with the first embodiment. A circumferential sealing surface 46 is provided at the lower edge of the conical portion 39. This surface 46 is the same as circumferential sealing surface 18 described above in that it has a diameter slightly greater than the pitch diameter of the male thread portion of the fitting on which it is to be used and a length which is slightly less than the distance between two adjacent male threads at the pitch diameter in order to allow the sealing ring to be "screwed" over the male threads as described in connection with the first modification. Extending radially from the lower edge of the sealing surface 46 is lower face 47. Lower face 47 extends parallel to the plane of the sealing ring outwardly to its circle of intersection 48 with the conical surface 43. As mentioned in connection with the circle of intersection 20, the circle of intersection 48 is rounded slightly in order to facilitate the "curling-in" action of the seal. The sealing ring is also dimensioned so that the circle 48 is substantially equal to or slightly greater than the dimension of the outer bore as is circle 20.

Figure 4:
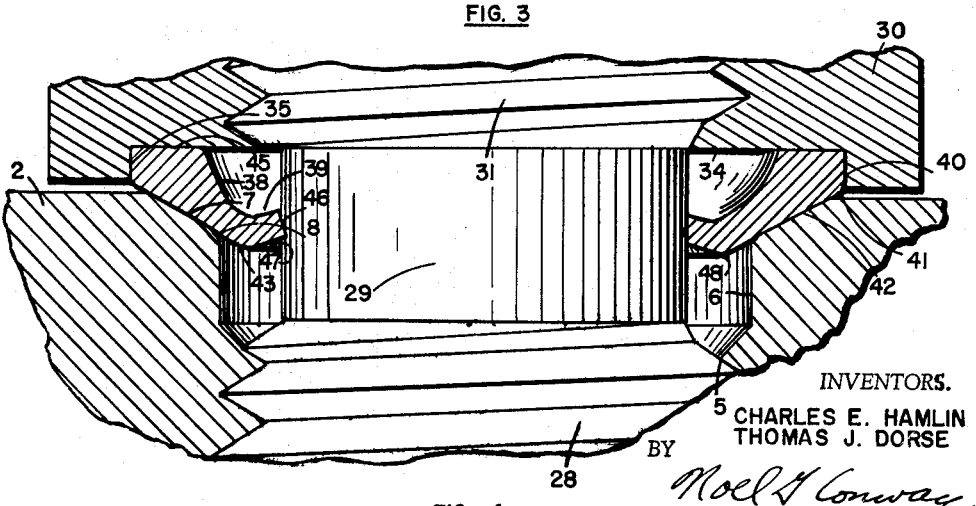
FIG. 4 shows a cross-sectional view of the modified sealing ring of FIG. 3 in final sealing position.

FIG. 4 discloses the sealing ring after it has been moved into sealing relation. As in the first modification, the means on the fitting, i.e., nut 30, has forced the sealing ring against the body 2 and forces the outer conical surface 43 against the camming surface 7 causing the section of the sealing ring in the area of the sealing surface 46 to be curved inwardly thus reducing the dimensions of the diameter of the sealing surface until it engages the neck 29 of the bulkhead fitting 26. Here again, since the camming surface 7 is at a large angle to the axis of the bore, the sealing ring is cammed or "curled" inwardly by the surface 7 at a large angle to the axis of the bore and engages the neck 29 circumferentially substantially in the plane of the circumferential edge 8. As in the first modification, a circumferential bent-beam portion is provided extending between the neck 29 and the circumferential edge 8 which has sufficient resiliency to seal even though the fitting be subjected to high vibration loads.

Table I shows the results of a representative portion of a series of tests which were conducted on sealing rings embodying the present invention. It is seen that no leakage occurred during the tests and date, this is the only seal available which will withstand the required conditions. As noted, some of the seals were disassembled and reassembled with further testing 15 times during the tests and no leakage occurred.

Although two specific embodiments of the invention have been described and illustrated in detail, it is to be clearly understood that these are for illustration and example only and are not to be taken as limitations; the spirit and scope of this invention being limited only by the terms of the appended claims.

*Table I*

| Material | 303 SS [1] | 303 SS [1] | 303 SS [1] | 303 SS [1] | 303 SS [1] | 61st aluminum (anodized). |
|---|---|---|---|---|---|---|
| Representative size | ½" | 1" | 5/16" | ½" | 1" | 1" |
| Temperature | −95° F | 70° F | 70 F | 500° F | 700° F | −95° F. |
| Pressure | 1,100 p.s.i. (4 hrs.) | 10,000 p.s.i | 0–3,000 p.s.i.[2] | 0–4,000 p.s.i.[3] | 4,000 p.s.i. (1 hr) | 1,100 p.s.i. (2 hrs). |
| Vibration loading | None | None | 230 G's | None | None | None. |
| Number of cycles | Static | Static | 13,500 | 36,000 | Static | Static. |
| Leakage | None | None | None | None | None | None. |

[1] Annealed freely machinable stainless steel.
[2] 1 impulse cycle per sec. with a disassembly and reassembly every 15 min. for 4 hrs.
[3] 1 impulse cycle per sec. and disassembling and reassembling once per hr. for 10 hrs.

We claim:

1. A fitting static seal combination comprising a body having a downwardly extending threaded bore with an opening of predetermined diameter in its upper side, an upwardly and outwardly extending conical camming surface formed around said bore opening in said upper side, said bore having a counterbore of larger diameter than said bore diameter adjoining said camming surface, a fitting member inserted in said bore, said fitting member comprising a neck portion forming a smooth cylindrical surface thereon, a sealing ring encircling said fitting member above said body, said sealing ring having an outer circumferential surface and an inner cylindrical surface, an upper outwardly and upwardly extending conical surface joining said last-mentioned surfaces at their respective upper edges, a downwardly facing outer conical surface forming the lower portion of said outer circumferential surface and forming an angle to the axis of the bore which is substantially less than said camming surface, an internal conical surface adjoining the bottom edge of said internal circumferential surface, said sealing ring having a peripherally continuous circumferential sealing surface adjoining said internal conical surface, said sealing surface constructed and arranged to encircle the neck portion of said fitting member, means integral with said fitting positioned upwardly and adjacent to said outer conical surface and initially constructed and arranged to only contact the upper edge formed by the upper conical surface and the outer circumferential surface of said sealing ring for forcing said outer conical surface against said camming surface and said means into contact with the upper edge formed by the upper conical surface and the inner cylindrical surface of said sealing ring whereby said sealing surface is adapted to be rotated and moved upwardly and inwardly into sealing relation with the neck portion of said fitting member.

2. The invention of claim 1 wherein the means integral with said fitting comprises: a complementary recess formed in said fitting adapted to receive said conical surface.

3. A fitting static seal combination comprising a body having a downwardly extending bore of predetermined diameter opening in its upper side, a cylindrical fitting having a neck portion of a diameter which is substantially less than said bore diameter extending into said bore, said neck portion forming a smooth cylindrical surface thereon, said fitting having an enlarged portion above said neck portion and said enlarged portion juxtapositioned above said body, a sealing ring encircling said neck, said sealing ring having: a circumferential sealing surface having a diameter substantially half way between the diameter of said neck and said bore, said sealing surface constructed and arranged to encircle the neck portion of said fitting, a lower face extending radially from the lower edge of said sealing surface, an outer circumferential surface extending outwardly and upwardly from the lower face at a large angle to said lower face, said outer circumferential surface extending at a large angle to said upper side, the circle of intersection between said face and said outer circumferential surface being substantially the same diameter as the diameter of the circle of intersection of said upper side and said bore portion, an inner circumferential surface extending outwardly and upwardly from the upper edge of said sealing surface at a large angle to the axis of said fitting for a distance equal to the radial width of said lower face, said inner circumferential surface then extending upwardly at a small angle to the axis of the fitting, an upper conically shaped surface extending in a downward direction toward said body between the inner and the outer circumferential surfaces and only initially abutting said enlarged portion at the outer circumferential portions thereof; and means on said fitting and body for moving said enlarged portion on said fitting downwardly relative to said body and against said sealing ring, whereby when said enlarged portion is moved downwardly, said sealing ring is curled inwardly by the upper side of said body and said conically shaped surface moves into abutting relation with said enlarged portion whereby said sealing surface is moved upwardly and inwardly and engages said neck forming a circumferential bent beam having its circle at which it is bent substantially half way between said neck and the circle of said bore.

4. In combination, a fitting having a smooth and cylindrical throat section, a nut portion on said fitting above said throat section, a body having a counterbore of substantially larger diameter than said neck, a camming surface around said counterbore, said throat portion positioned in the counterbore of said body, a static sealing ring circumferentially surrounding said throat portion, said ring having a conically shaped upper portion whose apex lies axially inwardly on said ring and an outer portion engaged by and receiving an inward force from said nut portion and said camming surface respectively, said upper portion constructed and arranged to only initially engage said nut portion at outer circumferential portions thereof and further constructed and arranged to engage the inner circumferentially extending portions thereof when sufficient force is imparted to said nut portion, an inwardly extending peripherally continuous sealing portion circumferentially engaging said throat portion substantially in the plane of the intersection of said counterbore and said camming surface, said ring receiving an outward force substantially in the opposite direction of said inward force from said throat portion, said ring having an inwardly and upwardly curled circumferential bent beam portion having its inner end where it engages said throat and its outer end where said counterbore intersects said camming surface, said ends being located in substantially the same plane, said bent beam portion being bowed by compression due to the opposite forces applied at either end whereby when pressurized fluid impinges on the counterbore side of said bent beam portion an increase in sealing action occurs between said sealing portion and said throat portion.

References Cited in the file of this patent
UNITED STATES PATENTS

| | | |
|---|---|---|
| 1,899,119 | Singer | Feb. 28, 1933 |
| 2,826,438 | Woodling | Mar. 11, 1958 |
| 2,990,200 | Yount | June 27, 1961 |
| 3,003,795 | Lyon | Oct. 10, 1961 |

FOREIGN PATENTS

| | | |
|---|---|---|
| 198,232 | Switzerland | Sept. 1, 1938 |

OTHER REFERENCES

"Applied Hydraulics," October 1955, vol. 8. No. 10, p. 57; published by the Industrial Publishing Group. (Copy in Scientific Library.)

"Applied Hydraulics," January 1956, vol. 9, No. 1, p. 77; published by the Industrial Publishing Group. (Copy in Scientific Library.)